United States Patent [19]
Matsubara et al.

[11] Patent Number: 5,236,264
[45] Date of Patent: Aug. 17, 1993

[54] LINEAR BEARING

[75] Inventors: Toshio Matsubara, Kawasaki; Takeo Koyama, Machida; Magozo Hamamoto, Zama; Shoichiro Koike, Takasaki, all of Japan

[73] Assignee: NSK Ltd., Tokyo, Japan

[21] Appl. No.: 895,371

[22] Filed: Jun. 9, 1992

[30] Foreign Application Priority Data

Jun. 10, 1991 [JP] Japan .............................. 3-051359[U]
Jun. 27, 1991 [JP] Japan .............................. 3-049372[U]

[51] Int. Cl.5 .......................................... F16C 29/04
[52] U.S. Cl. .................................................. 384/49
[58] Field of Search ................ 384/49, 30, 51, 447, 384/527, 534

[56] References Cited

U.S. PATENT DOCUMENTS 3,003,830 10/1961 Blazek et al. ........................ 384/49
3,922,037 11/1975 Yamada et al. ....................... 384/49

FOREIGN PATENT DOCUMENTS

| | | |
|---|---|---|
| 40-15222 | 6/1965 | Japan . |
| 48-14932 | 2/1973 | Japan . |
| 49-136941 | 11/1974 | Japan . |
| 50-111550 | 9/1975 | Japan . |
| 52-76853 | 6/1977 | Japan . |
| 53-5314 | 2/1978 | Japan . |
| 53-42672 | 10/1978 | Japan . |
| 55-31303 | 7/1980 | Japan . |
| 58-169220 | 11/1983 | Japan . |
| 59-166023 | 11/1984 | Japan . |
| 59-171838 | 11/1984 | Japan . |
| 61-36811 | 10/1986 | Japan . |
| 13483 | 6/1984 | United Kingdom . |

*Primary Examiner*—Lenard A. Footland
*Attorney, Agent, or Firm*—Wegner, Cantor, Mueller & Player

[57] ABSTRACT

A linear bearing is constructed of a shaft having a cylindrical outer wall, an outer race having a cylindrical inner peripheral wall, a cylindrical retainer inserted for axial displacement within a toroidal space between the outer wall and the inner wall, and plural balls retained for rotation in the retainer and in contact with the outer wall and the inner wall. The balls are provided more densely at axially opposite end portions of the retainer.

8 Claims, 6 Drawing Sheets

LINEAR BEARING

BACKGROUND OF THE INVENTION

1) Field of the Invention

This invention relates to a linear bearing suitable for assembly in various mechanical apparatuses with a linear motion part, such as measuring instruments and machine tools, so that the linear motion part can be displaced by small force. This invention also relates to a cylindrical, resin-made retainer permitting easy formation by injection molding, ready assembly of balls therein, and fail-free holding of the balls so assembled.

2) Description of the Related Art

To reduce the force required for the displacement of a linear motion part, linear bearings with plural balls assembled therein have already been proposed, for example, as disclosed in Japanese Utility Model Publication (Kokoku) Nos. SHO 40-15222, SHO 53-42672 and SHO 61-36811 and Japanese Utility Model Application Laid-Open (Kokai) No. SHO 58-169220.

Figure 3:
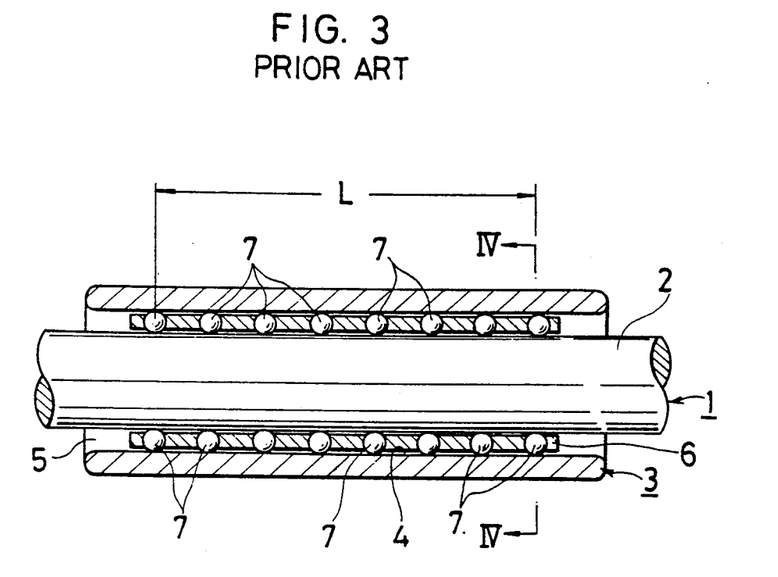
FIG. 3 is a longitudinal cross-section of the conventional linear bearing of FIG. 2.
Figure 4:
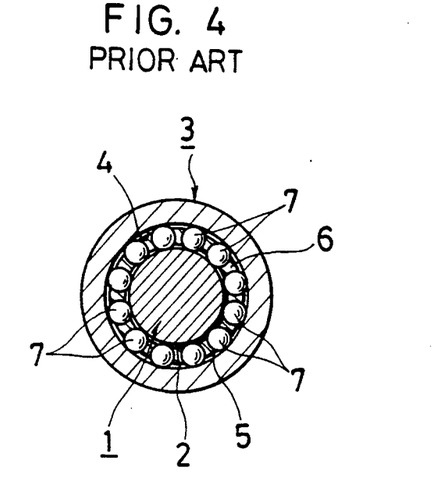
FIG. 4 is a transverse cross-section of the conventional linear bearing, taken in the direction of arrows IV—IV of FIG. 3.

FIGS. 3-4 illustrate one example of such linear bearings known to date. An outer peripheral wall 2 of a shaft 1 as an inner race means and an inner peripheral wall 4 of an outer ring 3 are formed as cylindrical walls, respectively. Within a toroidal space 5 between the outer peripheral wall 2 of the shaft 1 and the inner peripheral wall 4 of the outer ring 3, a cylindrical retainer 6 is inserted for axial displacement, namely, displaceably in an axial direction (i.e., the horizontal direction in FIG. 3 and the direction perpendicular to the drawing sheet of FIG. 4). The retainer 6, which has been formed by injection molding a synthetic resin, press forming a metal plate or machining a copper alloy, retains plural balls 7 for rotation. When held in the retainer 6, these balls 7 are maintained in contact with the outer peripheral wall 2 of the shaft 1 and also with the inner peripheral wall 4 of the outer ring 3.

As the linear bearing is constructed as described above, a relative axial displacement between the shaft 1 and the outer race 3 can be effected by a small force owing to rolling of the plural balls 7.

In the conventional linear bearing constructed as described above, the plural balls 7 are arranged evenly in the axial direction in the retainer 6 so that the conventional construction involves problems as will be described next.

No problem arises as long as the shaft 1 and the outer race 3 undergoes a axial displacement relative to each other while they are maintained in parallel to each other. If a moment is applied between the shaft 1 and the outer race 3 in such a way that the shaft 1 and race 3 are rendered non-parallel to each other, balls 7 located at axially opposite end portions are strongly pressed against the peripheral walls 2,4, respectively, so that the bearing stress becomes extremely large at these end portions. This leads to such a problem that durability is extremely reduced compared to the application of loads in a direction parallel to the shaft 1 or, in an extreme case, impressions are formed in the peripheral walls 2,4 to prevent smooth rolling of the balls 7 and hence to result in the need for greater force for a relative displacement between the shaft 1 and the outer race 3.

With a view toward coping with such problems, Japanese Utility Model Publication (Kokoku) No. SHO 53-42672 proposes to progressively reduce the outer diameter of the balls 7 toward the axial ends. By making the outer diameter of the balls 7 different as proposed above, it is possible to avoid the application of large pressing force to the balls 7 located at both ends even when a moment is applied. This approach, however, has raised another problem as will be described next.

When the outer diameter of the balls 7 is made different in the axial direction of the retainer, the differences are extremely small so that they cannot be distinguished visually. It is also difficult to distinguish these differences by an automatic bearing assembly apparatus. Ultimate carefulness is therefore required upon their assembly, leading to an unavoidable increase in the manufacturing cost of the linear bearing.

Further, conventional resin-made retainers include, for example, the resin-made retainer disclosed in Japanese Utility Model Laid-Open (Kokai) No. SHO 49-136941 (first conventional example). This is a resin-made snap bearing retainer in which, in one of the inner and outer peripheral walls of a main body of the retainer, recesses reaching one end of the peripheral wall—ball pockets being open at said one end—are provided between the ball pockets to form thin—walled portions between the recesses and the openings of the adjacent ball pockets.

In addition, Japanese Utility Model Publication (Kokoku) No. SHO 53-5314 discloses a resin-made retainer, in which plural balls arranged for rotation between an outer cylinder and inner cylinder to absorb impact energy are fitted under pressure in ball retaining pockets of a retainer ring made of a synthetic resin and the retainer satisfies the following dimensional relationship: the inlet diameter of each ball holding pocket < the diameter of each ball < the maximum inner diameter of the holding pocket (second conventional example).

On the other hand, Japanese Patent Application Laid-Open (Kokai) No. SHO 48-14932 discloses (1) a metal-made ball retainer (third conventional example) and also (2) a metal-made ball retainer (second conventional example). The metal-made ball retainer (2) is obtained by injection-molding a thick-walled, cylindrical synthetic resin body with ball-shaped core pieces inserted therein, removing the core pieces before the cylindrical body cools, fitting metal balls in the resulting pockets, and then allowing the cylindrical body to cool so that the balls are retained by the resulting contraction. The metal-made ball retainer (2) is obtained by providing a metal plate with holding pockets for fitting balls therein, and then providing each holding pocket with a raised edge on one side of the metal plate—said one side becoming an inner wall when the metal plate is formed into a cylinder and said edge being tilted to define a diameter somewhat smaller than the diameter of the ball—and with another raised edge on the other side of the metal plate—said the other side becoming an outer wall when the metal plate is formed into the cylinder and said another edge being tilted to define a diameter somewhat greater than the diameter of the ball—so that, after the ball is fitted in the holding pocket from the outside, the raised edge on the outer wall is pressed to hold the ball in the holding pocket (fourth conventional example).

The first conventional example is, however, accompanied by the problem that, as the peripheral edge of each ball pocket in which the ball is held is thinner locally only at portions between the opening of the ball pocket and its adjacent recesses, the peripheral edge of the ball pocket cannot be easily deformed to a sufficient extent upon assembling the ball in the ball pocket and a large force is hence required for the assembly. It also involves the problem that difficulties are encountered upon pulling out the core pins, which were employed for the formation of the inner peripheral walls of the pockets upon injection molding, from the retainer so molded.

The second conventional example involves the problem that, as the inlet diameter of each ball holding pocket is made smaller than the diameter of the ball within the thickness of the cylindrical retainer made of the synthetic resin, the ball must be press-fit into the ball holding pocket and a large force is required for the assembly of the ball as in the first conventional example. Any attempt to overcome this problem by a reduction in the thickness of the retainer, however, results in the problem that difficulties arise in positive ball retention.

The third conventional example is accompanied by the problems that the molding process is complex and, due to the need for the removal of the core pins before the molded cylindrical body cools, the final product can hardly be provided with high dimensional accuracy, thereby making it difficult to hold the balls positively.

The fourth conventional example is made of a metal so that it can be formed more thinly than the synthetic-resin-made retainers of the first to third conventional examples. It is, however, accompanied by the problem that its production process is complex because of the need for the formation of the raised edges for the holding of the balls and also for the crimping of the raised edges after fitting the balls in the holding pockets.

The first to fourth conventional examples are accompanied by further problems. When a cylindrical retainer is employed in a linear bearing for an oil-immersed solenoid valve, the constructions of the first to third conventional examples all produce large flow resistance against oil which flows axially. The fourth conventional example is made of metal so that its weight is as much as about 6 times the weight of a resin-made retainer, thereby producing large inertia force. The fourth conventional example therefore has improperly poor response in axial movements.

SUMMARY OF THE INVENTION

An object of this invention is to overcome the problems mentioned above with respect to the conventional linear bearings and, hence, to provide a linear bearing which can exhibit high durability even when a moment is applied between an inner retainer means and an outer retainer means in such a way that the inner retainer means and the outer retainer means are rendered non-parallel to each other and the bearing stress becomes extremely large at opposite end portions of the linear bearing.

Another object of this invention is to overcome the problems described above with respect to the conventional retainers and, hence, to provide a cylindrical, resin-made retainer which permits easy formation by injection molding, ready assembly of balls therein and fail-free holding of the balls so assembled, which has a light weight, and which produces small flow resistance against an axial flow of an oil so that, when employed in a linear bearing for an oil-immersed solenoid valve, can improve the operational response of the valve.

In one aspect of this invention, there is thus provided a linear bearing constructed of an inner race means, at least an outer peripheral wall thereof being formed as a cylindrical wall, an outer race means, at least an inner peripheral wall thereof being formed as a cylindrical wall, a cylindrical retainer defining pockets therein and inserted for axial displacement within a toroidal space between the outer peripheral wall and the inner peripheral wall, and plural balls retained for rotation within the pockets and in contact with the outer peripheral wall and the inner peripheral wall. The linear bearing is provided, as the retainer, with a retainer defining pockets formed more densely at axially opposite end portions thereof, whereby the plural balls (7) are arranged more densely at the axially opposite end portions.

Preferably, each of the pockets has a ball holding portion extending radially and outwardly from the outer peripheral wall of the cylindrical retainer. An inner peripheral wall of the ball holding portion has a spherical surface corresponding to the radius of the associated ball. A back wall of the ball holding portion is formed of a lower portion of a conical or hemispherical wall with a vertex located on an imaginary line ($L_1$), which extends through a center $O_1$ of the spherical surface of the inner peripheral wall of the ball holding portion and also through a radial center $O_2$ of the cylindrical retainer, and radially outside the outer peripheral wall of the cylindrical retainer. Desirably, the retainer is made of a resin, for example, a polyphenylene sulfide resin reinforced with glass fibers.

Like the conventional linear bearings described above, the linear bearing according to the present invention can reduce the force required for axially causing a relative displacement between the inner race means and the outer race means owing to rolling of the plural balls.

Further, when a moment is applied between the inner retainer means and the outer retainer means in such a way that the inner retainer means and the outer retainer means are rendered non-parallel to each other, this moment is borne by the balls arranged densely at the axially opposite end portions. The pressing force produced between each ball and the corresponding peripheral wall is therefore smaller, thereby making it possible to reduce the bearing stress against each peripheral wall. The linear bearing therefore has been improved in durability. If it is sufficient for the linear bearing according to the present invention to have the same service life as the conventional linear bearings, the former linear bearing can have greater load capacity. The distribution of load applied to the balls from the inner race means, for example, an inserted shaft is the greatest at the balls in both the outermost rows relative to the length of the retainer and becomes smaller toward the lengthwise center of the retainer. The denser arrangement of the balls at the opposite end portions can reduce the maximum load which each ball receives, thereby making it possible to reduce resistance upon displacement of the inner race means.

When the preferable retainer is made of the resin, it can be produced easily by injection molding. Each ball holding portion having the spherical inner wall and the conical or hemispherical outer wall is thin at a free end portion thereof and can be elastically deformed with ease there but is thick at a basal end portion thereof and has great elastic restoration ability and holding ability there. To fit the ball in the ball pocket, the ball holding portion is elastically deformed to enlarge the pocket. After the ball is fitted in the pocket, the ball holding portion elastically restore its original configuration so that the ball is held there. By forming the ball holding portions such that they sufficiently protrude from the cylindrical body, the holding of the balls can be ensured. Further, by reducing the wall thickness of the cylindrical body, the resistance to an axial flow of a fluid is lowered.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
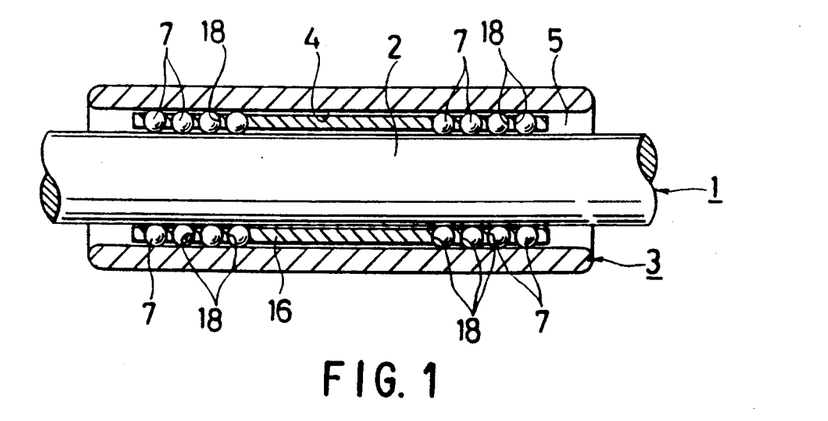
FIG. 1 is a longitudinal cross-section of a linear bearing according to one embodiment of one aspect of the present invention.

The linear bearing according to one embodiment of one aspect of this invention will hereinafter be described with reference to FIG. 1. An outer peripheral wall 2 of a shaft 1 as an inner race means and the outer peripheral wall 4 of an outer race are formed as cylindrical walls, respectively. Within a toroidal space 5 between the outer peripheral wall 2 of the shaft 1 and the inner peripheral wall 4 of the outer race 3, a cylindrical retainer 16 is inserted for axial displacement. The retainer 16, which has been formed by injection-molding a synthetic resin, press-forming a metal plate or machining a copper alloy, holds plural balls 7 for rotation. These plural balls 7 are maintained in contact with the outer peripheral wall 2 of the shaft 2 and also with the inner peripheral wall 4 of the outer race 3 while being held by the retainer 16.

The linear bearing is similar to the above-described conventional linear bearings as far as the construction described above is concerned. In the linear bearing according to the present invention, however, the plural balls 7 are not provided at a central portion of the retainer 16 but are arranged densely at opposite end portions of the retainer 16. As a matter of fact, a like plural number of pockets 18 for rotatably holding the balls 7 are provided in a zig-zag pattern at the opposite end portions of the retainer 16, whereby the balls 7 are densely arranged at the opposite end portions of the retainer 16.

The linear bearing according to this invention, which is constructed as described above, is similar to the above-described conventional linear bearings as far as its function itself, that is, a reduction in the force required for a relative axial displacement between the shaft 1 and the outer race 3 based on rolling of the plural balls 7 is concerned.

When a moment is applied between the shaft 1 and the outer race 3 of the linear bearing of this invention in a direction such that the shaft 1 and the outer race 3 would be rendered non-parallel, this moment is borne by the plural balls 7 arranged densely. As a result, the pressing force produced between each ball 7 and its corresponding peripheral wall 2 or 4 is reduced so that the bearing stress produced between the peripheral walls 2 and 4 is lowered.

Figures 2A, 2B, 2C:
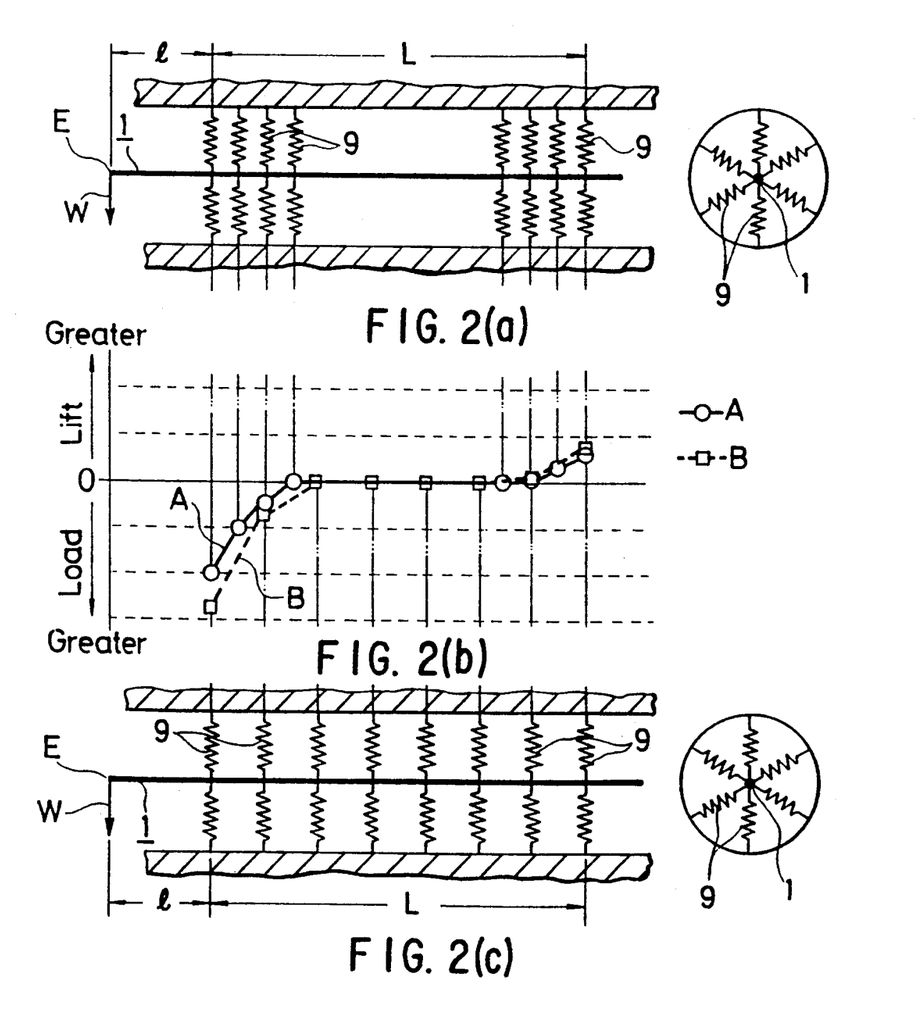
FIG. 2a is a schematic illustration of the linear bearing of FIG. 1 and a conventional evenly arranged linear bearing.
FIG. 2b shows load.
FIG 2c shows densely arranged balls.

The above function will be described further with reference to FIG. 2 in which the linear bearing according to the present invention and the conventional linear bearing are schematically illustrated. Designated at numeral 9 in FIG. 2 are springs disposed between the outer race 3 and the shaft 1. The springs 9 extend from the points of contact between the balls 7 and the outer race 3 to the points of contact between the balls 7 and the shaft 1, respectively. The shaft 1 is therefore assumed to be rotatably supported by the springs 9. From elastic deformation of each row of balls (spring 9) due to a load applied to the shaft 1, the load borne by the row of balls is calculated. The linear bearing according to this invention with the balls arranged densely at the axially opposite end portions thereof can then be depicted as in FIG. 2(a), while the conventional linear bearing with the balls 7 arranged evenly in the axial direction can be illustrated as in FIG. 2(c).

It is assumed that, in each bearing, the balls 7 are disposed in eight angular rows and the distance between the balls located at the opposite ends is L. It is now assumed that a moment W is applied perpendicularly to the shaft 1 at a point E spaced axially by $\lambda$ from the ball 7 located at one of the ends. In both the structures, conditions other than the arrangement of the balls 7, such as the radial intervals of the balls 7, are supposed to be the same.

In the structure corresponding to the linear bearing of the present invention and shown in FIG. 2(a), the loads borne by the springs 9 corresponding to the individual rows of balls can be represented by the solid line A in FIG. 2(b). In the structure corresponding to the conventional product and illustrated in FIG. 2(c), on the other hand, the loads borne by the springs 9 corresponding to the individual rows of balls can be represented by the dashed line B in FIG. 2(b). From a comparison between the solid line A and the dashed line B, it is understood that, in the linear bearing according to the present invention, the load applied to each row of balls for the same moment load W is smaller and the pressing force from each ball 7 against the outer peripheral wall 2 of the shaft 1 or the inner peripheral wall 4 of the outer race 3 can hence be reduced.

A trial calculation by the present inventors has revealed that, in a linear bearing provided with balls 7 in eight angular rows as in the above embodiment, the load applied to the balls in the row closest to the application point E of the moment W can be reduced as much as 26% in the product of this invention compared with the conventional product.

Figure 6:
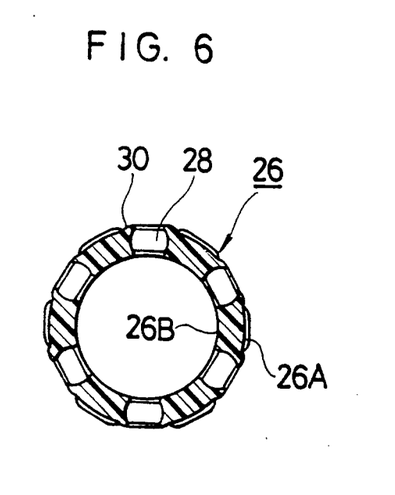
FIG. 6 is a transverse cross-section of the retainer, taken in the direction of arrows VI—VI of FIG. 5.
Figure 7:
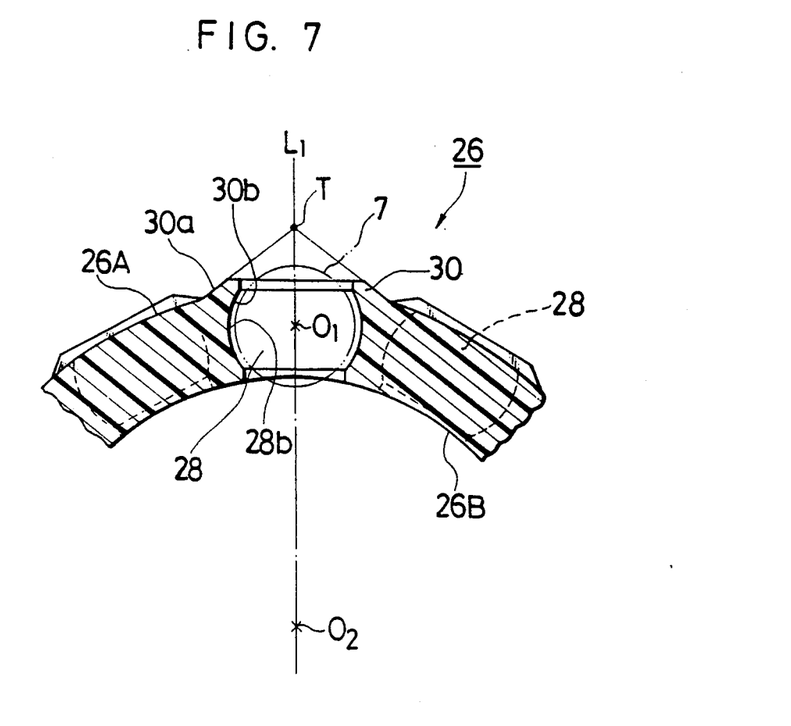
FIG. 7 is an enlarged, fragmentary cross-section of FIG. 6.
Figure 8:
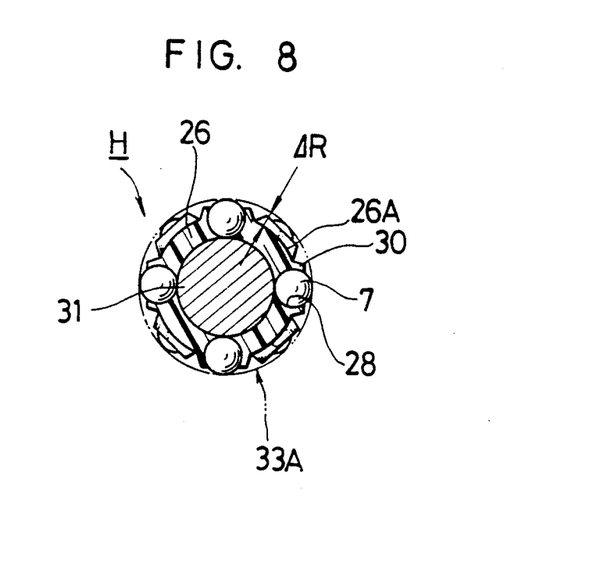
FIG. 8 is a schematic transverse cross-section of the retainer and balls fitted therein, as mounted between an outer race of a bearing and a shaft.

The cylindrical, resin-made retainer according to one embodiment of another aspect of the present invention will next be described with reference to FIGS. 5-8. It is to be noted that FIG. 8 shows fewer balls for the sake of clarification.

Figure 5:
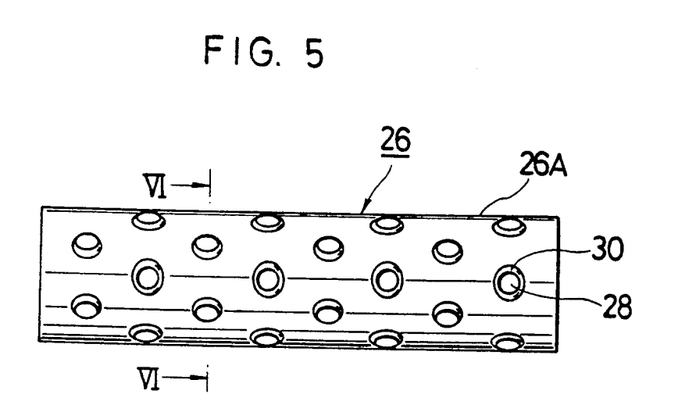
FIG. 5 is a front view of a cylindrical, resin-made retainer according to one embodiment of another aspect of the present invention.

The cylindrical, resin-made retainer designated at numeral 26 is a cylindrical body made of a synthetic resin. The retainer 26 has ball-holding pockets 28 arranged at equal intervals on circumferences perpendicular to an axis of the cylindrical body so that the ball-holding pockets 28 are distributed in a plural number of angular rows spaced from one another in the direction of the axis. The ball-holding pockets 28 in the adjacent angular rows are shifted in phase in the angular direction so that they are arranged in a zig-zag pattern.

At an edge portion of an opening of each ball-holding pocket 28 on the side of an outer peripheral wall 26A of the cylindrical body, the ball-holding pocket 28 is provided with a ball-holding portion 30 extending in the form of a ring radially and outwardly from the outer peripheral wall 26A of the cylindrical body. An inner peripheral wall 30b of the ball-holding portion 30 presents a spherical surface corresponding to the diameter of the ball 7 and forms a part of a spherical inner circumferential wall 28b of the ball-holding pocket 28. On the other hand, a back wall 30a of the ball-holding portion 30 is a lower part of a conical or hemispherical wall. Namely, the back wall 30a is formed of a lower part of a conical wall with a vertex located on an imaginary line ($L_1$)—which extends through a center $O_1$ of the inner peripheral wall 30b of the ball-holding portion 30, said inner peripheral wall 30b presenting the spherical surface (i.e., the center of the spherical inner peripheral wall 28b of the ball-holding pocket 28) and also through the axis $O_2$ of the cylindrical retainer, said axis being a radial center of the cylindrical body—and radially outside the outer peripheral wall 26A of the cylindrical body, or is formed of a lower part of a hemispherical wall having a radius greater than the radius of the inner peripheral wall of the ball-holding portion 30 but smaller than the radius of the outer peripheral wall 26A of the cylindrical body. On the side of an inner peripheral wall 26B of the cylindrical body, each ball-holding pocket 28 directly opens at the inner peripheral wall 26B without any ball-holding portion.

When the retainer 26 constructed as described above is molded using a synthetic resin, especially a polyphenylene sulfide resin (PPS resin) with glass fibers mixed in a proportion ranging from 10 wt. % to 40 wt. %, the resulting retainer has a light weight and large mechanical strength, undergoes extremely small dimensional changes by swelling, and is excellent in heat resistance and oil resistance. If glass fibers are mixed in any proportion smaller than 10 wt. %, the mechanical strength, dimensional stability and the like of the retainer product are not desirable. On the other hand, any proportions greater than 40 wt. % result in poor moldability. The retainer 26 of this embodiment was produced by injection molding, using the PPS resin "PHOTOLON KPS, W-200" (trade name; with 20 wt. % of glass fibers; product of Kureha Chemical Industry Co., Ltd.).

Figure 9:
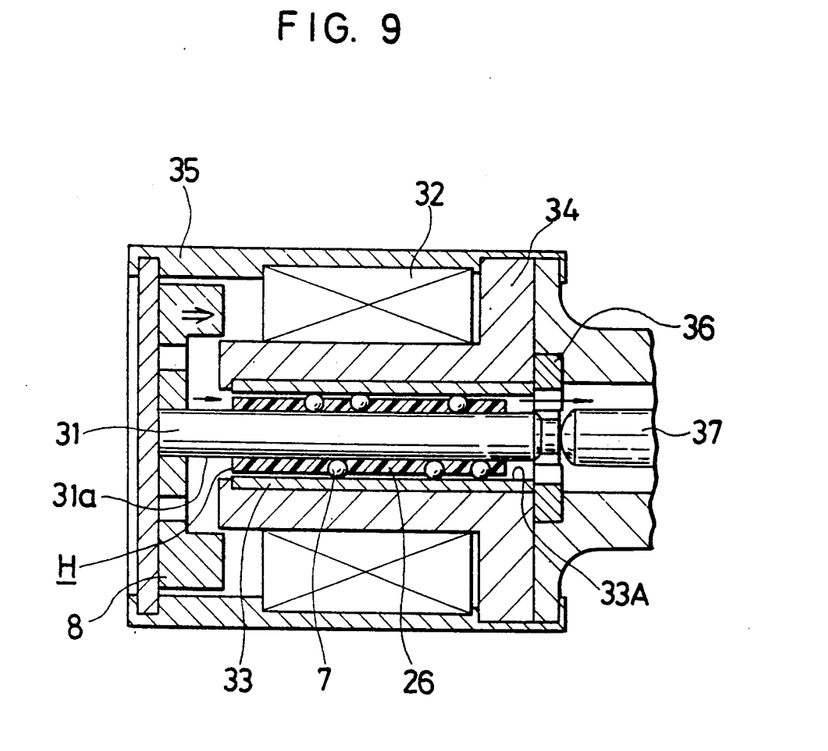
FIG. 9 is a longitudinal cross-section showing a retainer-ball assembly applied as a linear bearing for a plunger of an oil-immersed solenoid valve.
Figure 10A:
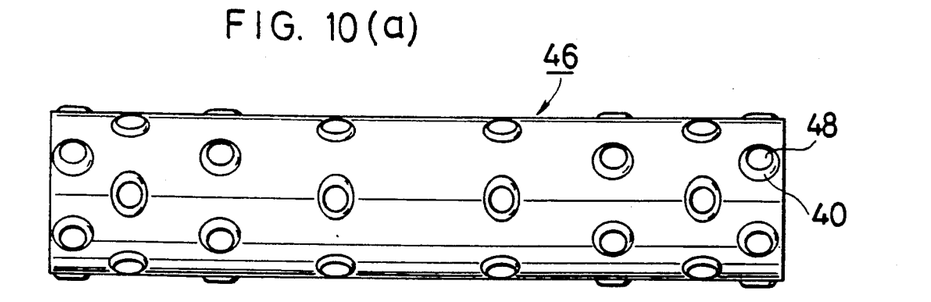
FIGS. 10(a) and 10(b) are front views of modifications of the retainer shown in FIG. 5, which are suitable for use in the linear bearing of FIG. 1.
Figure 10B:
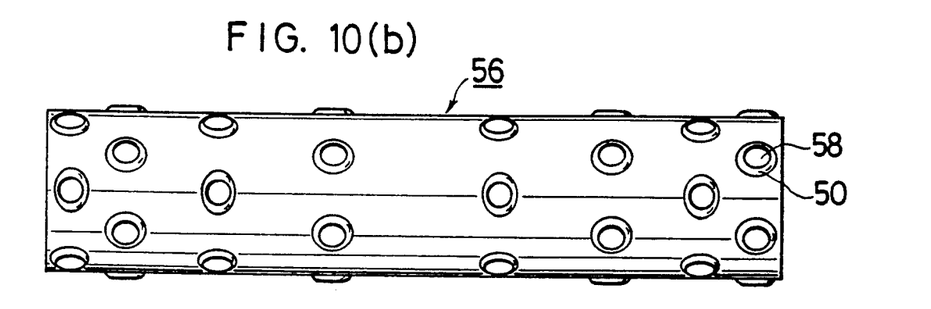
Figure 11A:
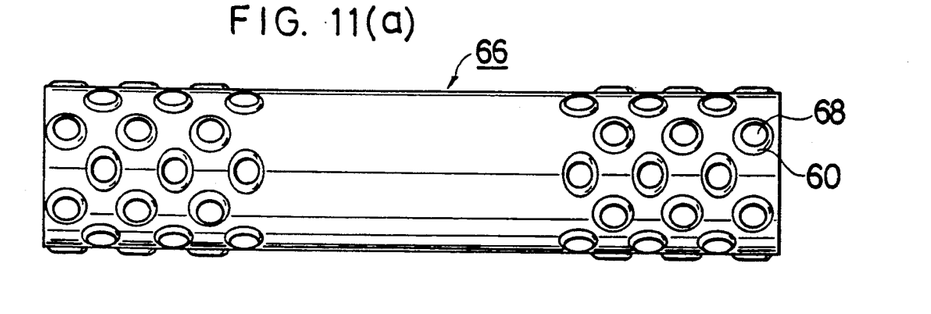
FIGS. 11(a) and 11(b) are front views of still further modifications of the retainer shown in FIG. 5, which are also suitable for use in the linear bearing of FIG. 1.
Figure 11B:
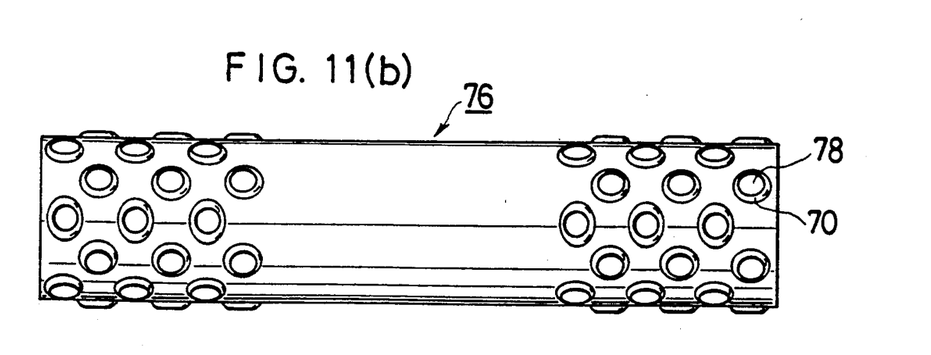

In the longitudinal cross-section of FIG. 9, a retainer assembly H assembled by fitting the balls 7 in the above retainer 26 is employed as a linear bearing for a plunger of an oil-immersed solenoid valve which is incorporated, for example, in a hydraulic circuit for the reduction of a shift shock by an automatic transmission of an automotive vehicle, a hydraulic circuit for a power steering of an automotive vehicle, or the like. In the drawing, there are shown a shaft 31 fixed on a plunger 8 of the solenoid valve, a coil 32 for attracting the plunger 8 against the resiliency of an unillustrated return spring, a core 34, an outer cylinder 35, a spacer 36, and a spool 37 movable axially to open or close a hydraulic flow path. The retainer assembly H is disposed between an outer retainer 33 fitted on a inner peripheral wall of the core 34 and an outer peripheral wall 31a of the shaft 31. The outer cylinder 35 is internally filled with an oil so that the retainer assembly H is immersed in the oil.

A description will next be made of the operation of the oil-immersed solenoid valve. In the retainer 26, the ball-holding portion 30 provided at the outer peripheral edge of the opening of each ball-holding pocket 28 is formed in such a way that its inner peripheral wall 30b presents a spherical surface and its back wall becomes a lower part of a conical or spherical wall. As a consequence, the ball-holding portion 30 gradually becomes thinner from the basal portion thereof toward the free end portion thereof, whereby the thin free end portion can be elastically deformed with ease but the thick basal portion curved inwardly in the form of a ring has large elastic restoration ability and great ball holding ability. Upon fitting the ball 7 in the ball-holding pocket 28, pressing of the ball 7 against the free end portion of the ball-holding portion 30 can thus easily deform the free end portion so that the ball 7 can be assembly under small force in the ball-holding pocket 28. As each ball-holding portion 30 protrudes radially and outwardly from the cylindrical body to have a radial length sufficient to hold the ball whose diameter is equal to or greater than the radial thickness of the cylindrical retainer, the ball-holding portion 30 can positively hold the ball 7 assembled therein. As is understood from the above description, it is essential that each ball-holding portion 30 of the retainer 26 is gradually reduced in thickness from the basal portion thereof toward the free end portion thereof, but each back wall may be in the form of a polygonal wall other than the conical or hemispherical wall.

When the retainer 26 is produced by injection molding, pocket pins employed to form the spherical inner peripheral walls 28b of the ball holding pockets 28 can be easily pulled out from the retainer 26. It is hence possible to avoid breakage or the like of the ball holding portions 30. The retainer 26 according to the above embodiment can be easily produced.

When the retainer assembly H with the balls 7 fitted in the retainer 26 is assembled in the oil-immersed solenoid valve as shown in FIG. 5 and is then used, the solenoid valve operates in the following manner.

When the coil 32 is energized for magnetization in FIG. 9, the plunger 8 is attracted toward the coil 32 against the biasing force of the unillustrated return spring and, at the same time, the shaft 31 moves rightwards in the drawing to push the spool 37. As the plunger 8 rightwards at this time, an oil flow occurs from the side of the plunger 8 toward the side of the spool 37. The spool 37 so pushed is caused to move rightwards in the axial direction so that the hydraulic circuit is switched over. When the current to the oil 32 is turned off, the plunger 8 and shaft 31 are resiliently pushed by the return spring so the plunger 8 and shaft 31 are resiliently pushed by the return spring and are caused to move leftwards in the drawing. At this time, the oil flows in the direction opposite to the above described and flows from the spool 37 toward the plunger 8.

In the above-described on/off operation of the solenoid valve, the movements of the shaft 31 are guided by the retainer assembly H. The balls 7 assembled in the retainer assembly H are in contact with the outer peripheral wall 31a of the shaft 31 and also with the inner peripheral wall 33A of the outer race 33. As the shaft 31 is moved, the balls 7 move under rolling so that the retainer 26 also moves in the axial direction. As is illustrated in FIG. 8, there is a clearance ΔR between the outer peripheral wall 26A of the cylindrical body of the retainer 26 of the retainer assembly H, which is interposed between the outer race 33 and the shaft 31, and the inner peripheral wall 33A of the outer race 33. Upon movement of the plunger 8 and retainer assembly H, the oil inside the valve therefore flows through the clearance ΔR. In the retainer 26 according to the present invention, it is therefore possible to reduce the wall thickness of the cylindrical body so that the clearance ΔR can be designed large. Such a large clearance ΔR is, therefore, effective in reducing the viscosity resistance of the oil against the axial movement of the retainer assembly H. This has made it possible to axially move the shaft 31 and plunger 8 a high speed and, hence, to improve the operation response of the oil-immersed solenoid valve.

The retainer 26 of this embodiment can be easily produced by injection-molding, as a material, PPS resin with glass fibers mixed in an appropriate proportion. PPS resin is a resin excellent in high-temperature oil resistance, heat resistance and chemical resistance. The retainer 26 is therefore not only lightweight but also highly resistant to oil and heat. It has been confirmed empirically that, even when assembled in an oil-immersed solenoid valve, the retainer 26 undergoes less swelling by the oil and can be used continuously over a long time at high temperatures up to 180° C. while maintaining stabile performance.

Incidentally, a phenol, polyamide or polyacetal resin is often employed as a resin material for conventional resin-made retainers. Phenol resins, however, do not permit injection molding so that they require laborious machining such as cutting and boring. This results in the drawback that the manufacturing cost is high. Regarding polyamide resins and polyacetal resins, on the other hand, they have problems in heat resistance and oil resistance. When retainers made of such a resin material are maintained in contact at high temperatures above 15° C. with an oil containing an extreme pressure additive, the retainers are progressively deteriorated with time so that they cannot exhibit stable performance over a long time. These conventional retainers are therefore not suited for use in such oil-immersed solenoid valves as described above.

Modifications of the above-described retainer 26 will now be described with reference to FIGS. 10(a) through 11(b), in which modified retainers are designated at numerals 46, 56, 66 and 76, respectively. These modified retainers 46,56,66,76 are similar to the retainer 26 except that pockets 48,58,68,78 are formed more densely at axial opposite end portions thereof. The modified retainers 46,56,66,76 are hence suitable for use in the linear bearing shown in FIG. 1. Like the retainer 26 illustrated in FIGS. 5–8, the modified retainers 46,56,66,76 are provided with ball-holding portions 40,50,60,70, respectively, which are similar to the ball holding portions 30 in the retainer 26. These modified retainers 46,56,66,76 therefore have the same advantages as the retainer 26. When one of these modified retainers 46,56,66,76 is used in place of the retainer 16 in FIG. 1, the resulting linear bearing can be produced easily at low cost and can exhibit extremely good durability.

What is claimed is:

1. In a linear bearing constructed of an inner race means, at least an outer peripheral wall thereof being formed as a cylindrical wall, an outer race means, at least an inner peripheral wall thereof being formed as a cylindrical wall, a cylindrical retainer defining pockets therein and inserted for axial displacement within a toroidal space between the outer peripheral wall and the inner peripheral wall, and plural balls retained for rotation within the pockets and in contact with the outer peripheral wall and the inner peripheral wall, the improvement wherein said linear bearing is provided, as said retainer, with a retainer defining pockets formed more densely at axially opposite end portions thereof, whereby the plural balls are arranged more densely at the axially opposite end portions.

2. The linear bearing of claim 1, wherein the inner race means is a shaft.

3. The linear bearing of claim 1, wherein the outer race means is an outer race.

4. The linear bearing of claim 1, wherein the pockets are arranged at equal angular intervals in angular rows spaced apart in the direction of an axis of the retainer.

5. The linear bearing of claim 4, wherein the pockets are arranged in a zig-zag pattern.

6. The linear bearing of claim 1, wherein each of said pockets has a ball holding portion extending radially and outwardly from the outer peripheral wall of the cylindrical retainer; an inner peripheral wall of the ball holding portion has a spherical surface corresponding to the radius of the associated ball; and a back wall of the ball holding portion is formed of a lower part of a conical or hemispherical wall with a vertex located on an imaginary line, which extends through a center of the spherical surface of the inner peripheral wall of the ball holding portion and also through a radial center of the cylindrical retainer, and radially outside the outer peripheral wall of the cylindrical retainer.

7. The linear bearing of claim 6, wherein the cylindrical retainer is made of a resin.

8. The linear bearing of claim 7, wherein the resin is a polyphenylene sulfide resin reinforced with glass fibers.

* * * * *